(12) United States Patent
Sato

(10) Patent No.: US 7,764,406 B2
(45) Date of Patent: Jul. 27, 2010

(54) IMAGE FORMING APPARATUS

(75) Inventor: Fumikazu Sato, Inuyama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1370 days.

(21) Appl. No.: 11/083,105

(22) Filed: Mar. 18, 2005

(65) Prior Publication Data

US 2005/0219656 A1 Oct. 6, 2005

(30) Foreign Application Priority Data

Mar. 19, 2004 (JP) ............................ P2004-080933

(51) Int. Cl.
*H04N 1/04* (2006.01)
(52) U.S. Cl. ...................... 358/474; 358/1.15; 358/498; 358/448; 358/442; 358/401; 399/367; 399/369; 355/75; 347/104; 347/108; 271/65; 271/186; 395/107; 395/110
(58) Field of Classification Search ................ 358/474, 358/498, 497, 496, 448, 1.15, 401, 296, 442; 399/367, 369, 103, 105, 106, 377, 380; 355/75; 347/104, 3, 108; 271/65, 186; 395/107, 395/110, 370
See application file for complete search history.

(56) References Cited

U.S. PATENT DOCUMENTS

| | | | | |
|---|---|---|---|---|
| 5,440,372 A * | 8/1995 | Ito et al. | | 399/20 |
| 5,557,390 A * | 9/1996 | Ito et al. | | 399/85 |
| 5,585,943 A * | 12/1996 | Kikuchi | | 358/498 |
| 5,832,338 A * | 11/1998 | Kuga | | 399/82 |
| 5,844,687 A * | 12/1998 | Nagane et al. | | 358/296 |
| 5,855,943 A * | 1/1999 | Lush et al. | | 426/516 |
| 5,956,161 A * | 9/1999 | Takashimizu et al. | | 358/496 |
| 6,102,506 A * | 8/2000 | Sasai et al. | | 347/3 |
| 6,321,063 B1 * | 11/2001 | Tanaka et al. | | 399/367 |
| 7,046,941 B2 * | 5/2006 | Kameyama et al. | | 399/107 |
| 7,110,139 B2 * | 9/2006 | Silverbrook | | 358/1.8 |
| 7,289,156 B2 * | 10/2007 | Silverbrook et al. | | 348/374 |

(Continued)

FOREIGN PATENT DOCUMENTS

CN 2567919 8/2003

(Continued)

OTHER PUBLICATIONS

Brother, "Prospekt: MFC-8420, MFC-8820D, MFC-8820DN", 2003.

(Continued)

*Primary Examiner*—Negussie Worku
(74) *Attorney, Agent, or Firm*—Banner & Witcoff, Ltd

(57) ABSTRACT

An image forming apparatus includes a sheet discharge unit, a reading unit disposed above the sheet discharge unit, an operating panel, and an opening portion formed between the reading unit and the sheet mount unit such that the sheet can be taken out from the front side of the apparatus. The operating panel extends to the front side of the apparatus in the reading unit so that the tip thereof is located at the same position as the front end portion side of the sheet mount unit or projects from the front end portion side. There is provided an area where the projection amount from the reading unit is set to be smaller than the maximum projection amount of the operating panel.

25 Claims, 12 Drawing Sheets

U.S. PATENT DOCUMENTS

| | | | |
|---|---|---|---|
| 7,302,204 B2* | 11/2007 | Katsuyama et al. | 399/107 |
| 2004/0190084 A1* | 9/2004 | Shirai | 358/474 |
| 2004/0201872 A1* | 10/2004 | Horaguchi et al. | 358/500 |

FOREIGN PATENT DOCUMENTS

| | | |
|---|---|---|
| JP | 6-194893 | 7/1994 |
| JP | 8-337349 | 12/1996 |
| JP | 9-160439 | 6/1997 |
| JP | 10-247051 | 9/1998 |
| JP | 2000 344398 A | 12/2000 |
| JP | 3205734 B2 | 6/2001 |

OTHER PUBLICATIONS

European Search Report for Application No. 05005999 dated Jun. 28, 2006.

Chinese Office Action of Application No. 2005100559384 dated Feb. 15, 2008, with English translation thereof.

User Manual for HP LaserJet 3300mfp, Copyright 2002, Edition 2, Apr. 2009.

User Manual for HP LaserJet 3300mfp, Copyright 2002, Edition 2, Jan. 2002.

* cited by examiner

IMAGE FORMING APPARATUS

BACKGROUND OF THE INVENTION

1. Field of the Invention

The present invention relates to an image forming apparatus.

2. Background Art

There has been hitherto provided such an image reading/storing apparatus that a flat bed type reading unit is disposed above a print mechanism and an operating panel is integrally formed at the front side of the reading unit. For example, as disclosed in JP-A-10-247051, the construction as described above is provided with a sheet discharge route so that a recording sheet is discharged from the print mechanism therethrough to a place which is a side of the apparatus and below the reading unit, and also with a sheet discharging unit which takes out a sheet thus discharged and disposed at a side of the print mechanism (below the reading unit).

SUMMARY OF THE INVENTION

In this type of image reading/storing device having the print mechanism and the reading unit, miniaturization thereof is strongly required, and it has been required to reduce the setup area and the height of the apparatus. In order to reduce the setup area, for example, the sheet discharging unit is disposed above the print mechanism in place of arrangement of the sheet discharging unit at the side of the print mechanism, and the reading unit is also disposed above the sheet discharging unit. This arrangement can reduce the setup area and also suppress lateral expansion of the apparatus. That is, the print mechanism and the sheet discharging unit are not arranged in juxtaposition with each other in the lateral direction, but arranged in the vertical direction, thereby preventing the apparatus from being expanded in the lateral direction.

The construction that the sheet discharge unit is provided above the print mechanism as described above and further the reading unit is provided above the sheet discharging unit has a characteristic that the overall construction of the apparatus is higher as compared with the construction that the print mechanism and the sheet discharging unit are arranged in the lateral direction as disclosed in the Patent Document 1, and it has been required to enhance the operability in consideration of the above characteristic and reduce the height of the apparatus as much as possible.

The present invention has been implemented in view of the foregoing situation, and has an object to provide an image forming apparatus equipped with a sheet discharging unit having a sheet mount portion above a print mechanism and also with a reading unit above the sheet discharging unit, in which operability can be effectively enhanced and the height of the apparatus can be reduced.

The invention provides an image forming apparatus, including: a print mechanism; a sheet discharge unit located above the print mechanism, the sheet discharge unit having a sheet discharge port and a sheet mount unit that mounts thereon a sheet discharged from the sheet discharge port; a reading unit disposed above the sheet discharge unit so as to cover substantially an overall upper portion of the sheet mount unit; an operating panel; and an opening portion formed between a lower surface of the reading unit and a sheet mount face of the sheet mount unit; wherein, when the downstream side in a discharge direction of a sheet discharged from the sheet discharge port to the sheet mount unit is set as a front side of the apparatus, the opposite side is set as a rear side and a direction perpendicular to the front-and-rear direction is set as a width direction, the operating panel extends to the front side of the apparatus in the reading unit so that the tip thereof is located at the same position as the front end portion side of the sheet mount unit or projects from the front end portion side; the opening portion is opened so that the sheet can be taken out from the front side of the apparatus; and there is provided an area where the projection amount from the reading unit of the operating panel is set to be smaller than the maximum projection amount of the operating panel.

Preferably, the area includes a cut-out portion is provided to a part in the width direction of the operating panel which faces the opening portion.

Preferably, the operating panel extends from the front side end edge of the reading unit downwardly or obliquely downwardly.

Preferably, a recess portion is formed at a part in the width direction of the peripheral edge of the operating panel which faces the opening portion.

Preferably, the sheet discharge port is designed so as to extend in the width direction at the rear side of the sheet mount unit, and the length in the width direction of the recess portion is set to be equal to or longer than the width of the sheet discharge port.

Preferably, the image forming apparatus further includes: a stopper which is rotatable around an axial line parallel to the width direction or slidable in the front-and-rear direction at the front end portion of the sheet mount unit; wherein the stopper is positionally set to a first position at which a part thereof is extended ahead of the sheet mount unit to support a sheet at the front side of the sheet mount unit and a second position at which the stopper is accommodated at the sheet mount unit side; and the length in the width direction of the recess portion is set to be equal to or longer than the length in the width direction of the stopper.

Preferably, the image forming apparatus further includes: a stopper which is rotatable around an axial line parallel to the width direction at the front end portion of the sheet mount unit; wherein the stopper is positionally set to a first position at which a part thereof is extended ahead of the sheet mount unit to support a sheet at the front side of the sheet mount unit, and a second position at which the stopper is accommodated at the sheet mount unit side; and the arrangement relationship between the recess portion and the stopper is set so that a rotational locus of the stopper does not interfere with the operating panel.

Preferably, when the stopper is rotated between the first position and the second position, the tip portion thereof is rotated forward and backward while passing through the recess portion.

Preferably, the image forming apparatus further includes: a sheet accommodating unit formed between the sheet mount face of the sheet mount unit and the lower surface portion of the reading unit, both disposed so as to be spaced from each other at a predetermined interval in the vertical direction; wherein the upper end of the sheet accommodating unit and the upper end of the recess portion are set to be located substantially at the same position in the vertical direction.

Preferably, when sheets of the maximum capacity loading of the image forming apparatus are put on the sheet mount unit, the upper end of the recess portion is located at a higher position than the uppermost surface of the sheets.

Preferably, a plurality of keys corresponding to plural kinds of functions; wherein the plurality of keys include keys exclusively-used for a first kind of function collectively arranged at any one of the right and left sides of the recess portion; and the plurality of keys include keys exclusively-used for a second kind of function different from the first kind are collectively arranged at the other side.

Preferably, the first kind of function is a copy function; and the second kind of function is the FAX function.

Preferably, the operating panel includes an image display unit configured to display an image relating to an operation, and a plurality of keys; the image display unit is provided at one of the right and left sides of the recess portion; and the plurality of keys are disposed at the other side.

Preferably, the operating panel is provided with switching keys for switching a plurality of kinds of functions; and the switching keys are located from the base portion of the recess portion to the tip side of the recess portion.

Preferably, the operating panel has a predetermined curved shape; and the operating panel has a portion having the maximum projection amount from the reading unit, the portion displaced from the center in the width direction of the opening portion.

Preferably, the reading unit includes: a lid portion which is openable and closable, an original mount face on which an original is mounted, the original mount face exposed when the lid portion is opened, and a reading mechanism provided at a lower side of the original mount face; and the original mount face and the operating face of the operating panel are inclined to each other.

Preferably, the operating panel includes an operating face; the reading unit includes an original mount face on which an original is mounted; and the operating face and the original mount face are inclined to each other so that the intersecting angle therebetween is set in the range from 30° to 60°.

Preferably, the operating panel includes a display portion having a flat outer surface; and the reading unit includes an original mount face on which an original is mounted; the display portion and the original mount face of the reading unit are inclined to each other so that the intersecting angle therebetween is set in the range from 30° to 60°.

Preferably, the image forming apparatus further includes: a housing that surrounds the print mechanism; wherein the housing has an openable/closable opening portion at the front portion thereof, the openable/closable opening portion allowing parts of the print mechanism to be replaced therethrough.

Preferably, the image forming apparatus further includes: a sheet supply tray that supplies a sheet to the print mechanism; wherein the sheet supply tray is manipulated from the front side of the image forming apparatus so as to be opened.

Preferably, the reading unit includes a base portion and a lid portion that is openable and closable with respect to the base portion; and the operating panel extends from the base portion.

The invention may provide an image forming apparatus, including: a print mechanism; a sheet discharge unit located above the print mechanism, the sheet discharge unit having a sheet discharge port and a sheet mount unit that mounts thereon a sheet discharged from the sheet discharge port; a reading unit disposed above the sheet discharge unit so as to cover substantially an overall upper portion of the sheet mount unit; an operating panel; and an opening portion formed between a lower surface of the reading unit and a sheet mount face of the sheet mount unit; wherein, when the downstream side in a discharge direction of a sheet discharged from the sheet discharge port to the sheet mount unit is set as a front side of the apparatus, the opposite side is set as a rear side and a direction perpendicular to the front-and-rear direction is set as a width direction, the operating panel extends to the front side of the apparatus in the reading unit so that the tip thereof is located at the same position as the front end portion side of the sheet mount unit or projects from the front end portion side; and the reading unit has an original mount face on which an original is mounted; and the operating panel has an operating face that is inclined to the original mount face.

The invention may provide an image forming apparatus, including: a print mechanism; a sheet discharge unit located above the print mechanism, the sheet discharge unit having a sheet discharge port and a sheet mount unit that mounts thereon a sheet discharged from the sheet discharge port; a reading unit disposed above the sheet discharge unit so as to cover substantially an overall upper portion of the sheet mount unit; an operating panel; and an opening portion formed between a lower surface of the reading unit and a sheet mount face of the sheet mount unit; wherein the operating panel extends to the front side of the apparatus in the reading unit so that the tip thereof is located at the same position as the front end portion side of the sheet mount unit or projects from the front end portion side; the opening portion is opened so that the sheet can be taken out from the front side of the apparatus; and there is provided an area where the projection amount from the reading unit of the operating panel is set to be smaller than the maximum projection amount of the operating panel According to one aspect of the invention, in which the construction that the operating panel is designed to extend to the front side of the apparatus, the extension of the operating panel is liable to induce reduction of the visibility of the surrounding of the sheet discharge portion and reduction of operability when a discharged sheet is taken out. On the other hand, according to the construction, in the operating panel, a part in the width direction of the operating panel which faces the opening portion for taking out therethrough a sheet is provided with the cut-out portion or the area at which the projection amount of the operating panel from the reading unit is set to be smaller than the maximum projection amount of the operating panel. Therefore, the upper side of the opening portion is set to be open, and the visibility of the surrounding of the sheet discharge portion and the operability when a discharged sheet is taken out can be effectively secured.

In the image forming apparatus in which the sheet discharge unit is provided above the print mechanism and the reading unit is provided above the sheet discharge unit, the apparatus has a characteristic that the overall construction thereof is liable to be high. Accordingly, from this construction characteristic, it is not favorable that the reading unit (operating panel) and the sheet discharge unit (sheet mount unit) are disposed so as to be spaced from each other, that is, the opening portion is designed to be broad because it further increases the height. On the other hand, in the construction according to another aspect of the invention, that is, in the construction that the operating panel is designed so as to extend from the end edge at the front side of the reading unit downwardly or obliquely downwardly, the operability and the visibility are excellent to operate the operating panel. However, when the opening portion is narrowed and the apparatus is miniaturized in the height direction under the above state, the extension of the operating panel in the downward or obliquely downward direction may cause such a problem that the visibility of the surrounding of the sheet discharge portion is lowered or it is difficult to carry out a take-out work. On the other hand, according to this construction, the gap of the opening portion is partially enlarged by providing the cut-out portion or the area having the small projection amount at a part in the width direction of the operating panel, so that the visibility of the surrounding of the opening portion of the sheet discharge portion and the operability can be effectively prevented from being disturbed by the extension of the operating panel. Therefore, the apparatus can be designed so that the sheet discharge unit can be easily accessed (that is, an operation of taking out a sheet by inserting a hand can be easily performed) while implementing the miniaturization of the apparatus in the height direction.

According to another aspect of the invention, the gap of the opening portion can be effectively enlarged by forming a recess portion at the peripheral edge of the operating panel.

According to another aspect of the invention, the width of the recess portion is set to be equal to or larger than the width of the sheet discharge port, so that the sheet to be discharged to the sheet mount unit can be easily viewed and taken out through the gap formed by the recess portion.

According to another aspect of the invention, by providing the stopper, the sheet can be prevented from falling off at the front side of the sheet mount unit. In addition, the length in the width direction of the recess portion in the operating panel is set to be equal to or longer than the length in the width direction of the stopper, so that the stopper can be made to sufficiently and excellently function while securing sufficient visibility and operability in the neighborhood of the opening portion.

According to another aspect of the invention, the rotational locus of the stopper does not interfere with the operating panel, and thus the stopper can be made to sufficiently and excellently function while securing sufficient visibility and operability in the neighborhood of the opening portion.

According to another aspect of the invention, when the stopper is rotated between the first position and the second position, the tip portion thereof passes through the recess portion and forward and backward rotates without interfering with the operating panel. Therefore, even when the gap of the opening portion is narrowed, it is unnecessary to restrict the size of the stopper. Furthermore, the rotational shaft of the stopper and the operating panel can be disposed so as to be closer to each other, and thus it contributes to miniaturization of the overall construction of the apparatus.

According to another aspect of the invention, the upper end of the sheet accommodating unit and the upper end of the recess portion are located substantially at the same position in the vertical direction. Therefore, visibility is excellent over the whole sheet accommodating unit, and thus excellent workability can be secured.

According to another aspect of the invention, the upper end of the recess portion of the operating panel is located at a higher position than the upper surface of sheets when sheets of the maximum capacity loading are mounted. Therefore, even when lots of sheets are discharged to the sheet discharge unit, the upper end of the recess portion, the sheets can be suitably taken out through the recess portion.

According to another aspect of the invention, the keys exclusively-used for specific kinds of function are collectively arranged at the right and left sides respectively, and thus the associated keys are arranged in proximity to one another, so that the key operation can be easily performed.

According to another aspect of the invention, when FAX transmission is carried out or when copy is carried out, the key operation can be easily performed to execute the respective functions because the associated keys are collectively arranged.

According to another aspect of the invention, the image display unit is provided at only one side while the image display unit is not provided at the other side and plural keys are arranged at the other side, so that the key operation can be easily performed while viewing the image display unit.

According to another aspect of the invention, the frequently-used switching keys, etc. are arranged at the tip side of the operating panel, so that the key operation can be more easily performed. Particularly when the apparatus is set up at a high position, the frequently-used keys are arranged at the front side, and thus the key operation can be easily performed.

According to another aspect of the invention, the portion of the operating panel at which the projection amount is maximum is shifted to one side in the width direction of the opening portion, and thus in the neighborhood of the center portion in the width direction of the opening portion, the upper side of the center portion is kept open. Therefore, even when the interval of the opening portion is narrowed, it can be prevented that the sheet discharge portion is hardly accessed.

According to another aspect of the invention, when the original mount face of the reading unit and the operating face of the operating panel are arranged to be inclined to each other, even when the image forming apparatus is disposed at a high position or low position, the visibility when the key operation is carried out on the operating panel can be secured, and thus the operation can be made excellent even when the image forming apparatus is disposed at any setup position.

According to another aspect of the invention, when the operating face of the operating panel and the original mount face of the reading unit are inclined to each other so that the intersecting angle therebetween ranges from 30° to 60°, the visibility and the operability can be further excellently secured even when the apparatus is disposed at a high or low position.

According to another aspect of the invention, the display unit having the flat outer surface is provided to the operating panel, and the display unit and the original mount face of the reading unit are inclined to each other so that the intersecting angle therebetween ranges from 30° to 60°, so that the visibility of the display unit can be excellently secured in various setup positions.

According to another aspect of the invention, the opening portion for exchanging parts constituting the print mechanism is provided at the front portion of the housing surrounding the print mechanism so as to be opened/closed. Therefore, even in the construction that the sheet discharge unit and the reading unit are disposed above the print mechanism, the part exchange work relating to the print mechanism can be easily performed.

According to another aspect of the invention, the sheet supply tray is set to an open state by manipulating the sheet supply tray from the front side of the image forming apparatus. Therefore, even in the construction that the sheet discharge unit and the reading unit are disposed above the print mechanism, the operations relating to the sheet supply tray such as an operation of supplementing sheets, etc. can be easily performed.

According to another aspect of the invention, the image forming apparatus in which the sheet discharge portion is provided above the print mechanism and the reading unit is provided above the sheet discharge unit has the characteristic that the construction of the apparatus is liable to be high as a whole. Accordingly, in the construction that the operating panel is integrally provided to the reading unit, for example when the apparatus is set up at a high position, the operating panel is disposed at a high position. Therefore, when the operating face of the operating panel is substantially horizontally disposed like the prior art, there may occur such a problem that a display cannot be checked or it is difficult to carry out the key operation. Conversely, if the operating face is set to be substantially vertical, the same problem as described above occurs when the apparatus is disposed at a low position. Particularly in connection with the progress of the miniaturization of the apparatus, this type of apparatus has been generally popular for SOHO or domestic use. Under such an atmosphere, various setup cases of the apparatus at a high position or at a low position may be adopted in accordance with restriction on the setup space or the like, and thus the apparatus construction has been required to meet various setup positions. For this problem, if the original mount face of the reading unit and the operating face of the operating panel are inclined to each other as in the case of the construction of claim 20, the visibility when the key operation is carried out on the operating panel can be secured even when the image forming apparatus is set up at a high position or low position, and thus the operation can be excellently performed at various setup positions.

According to another aspect of the invention, the operating face of the operating panel and the original mount face of the reading unit are inclined to each other so that the intersecting angle therebteween ranges from 30° to 60°. Accordingly, even when the apparatus is disposed at a high position or low position, the visibility and operability can be further excellently secured.

BRIEF DESCRIPTION OF THE DRAWINGS

The present invention may be more readily described with reference to the accompanying drawings.

DETAILED DESCRIPTION OF THE PREFERRED EMBODIMENTS

Embodiment 1

An embodiment 1 according to the present invention will be described with reference to FIGS. 1 to 8.

The overall construction of a multifunctional apparatus 100 which is an example of an image forming apparatus will be described with reference to FIGS. 1 to 3. In this embodiment, a downstream side in a discharge direction of a sheet to be discharged from a sheet discharge port 323 to a sheet mount portion 322 is set as an apparatus front side, the opposite side thereto is set as a rear side, and the right-and-left direction perpendicular to the front-and-rear direction is set as a width direction. Specifically, the direction to the front side, the direction to the left side, the direction to the right side, the direction to the back side, the direction to the upper side and the direction to the bottom side are set as −Z direction, −X direction, +X direction, +Z direction, +Y direction and −Y direction, respectively. That is, The Z-axis direction corresponds to the front-and-rear direction, and the X-axis direction corresponds to the width direction.

Figure 1:
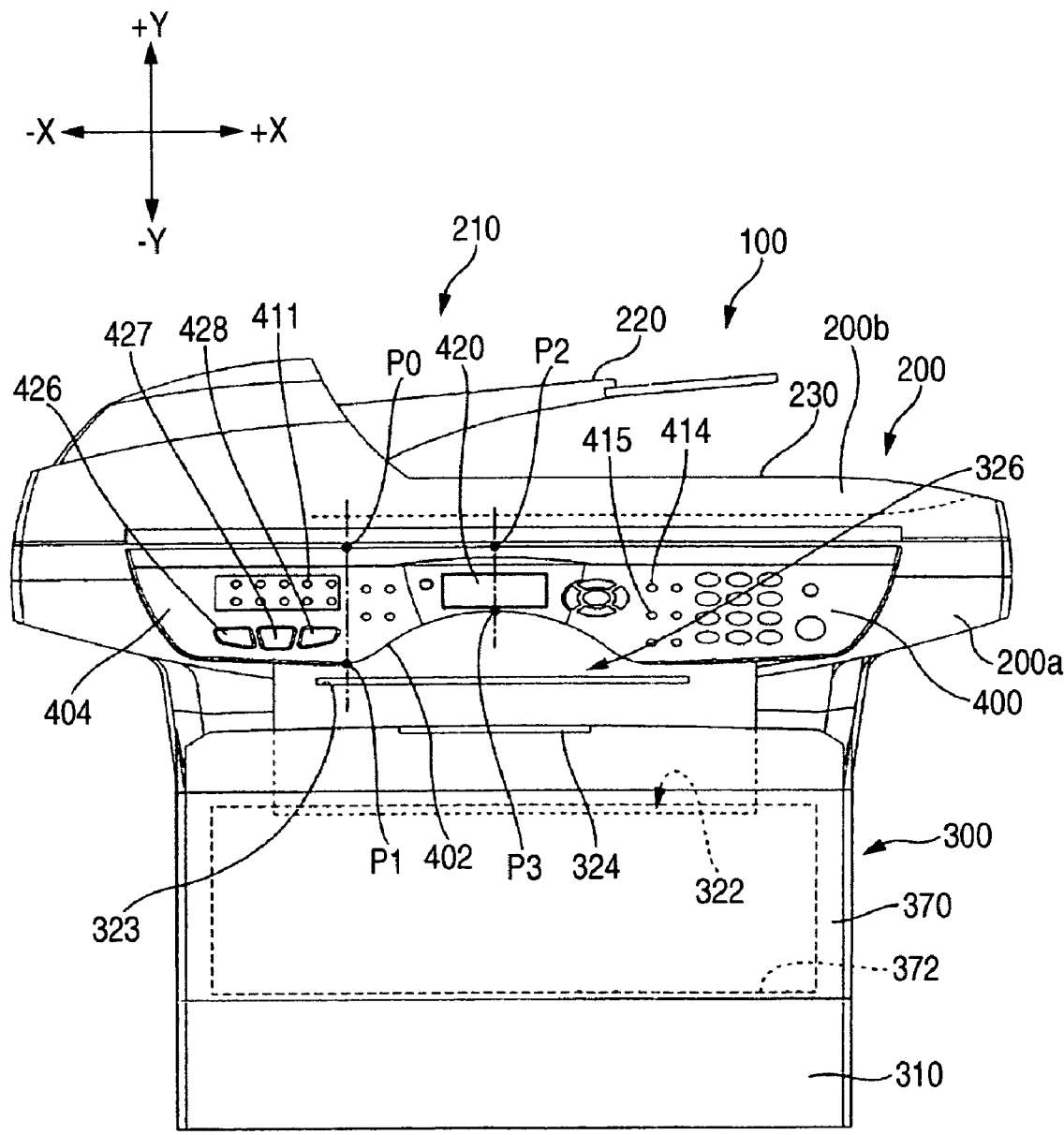
FIG. 1 is a front view showing an example of a multifunctional apparatus according to a first embodiment of the present invention.
Figure 2:
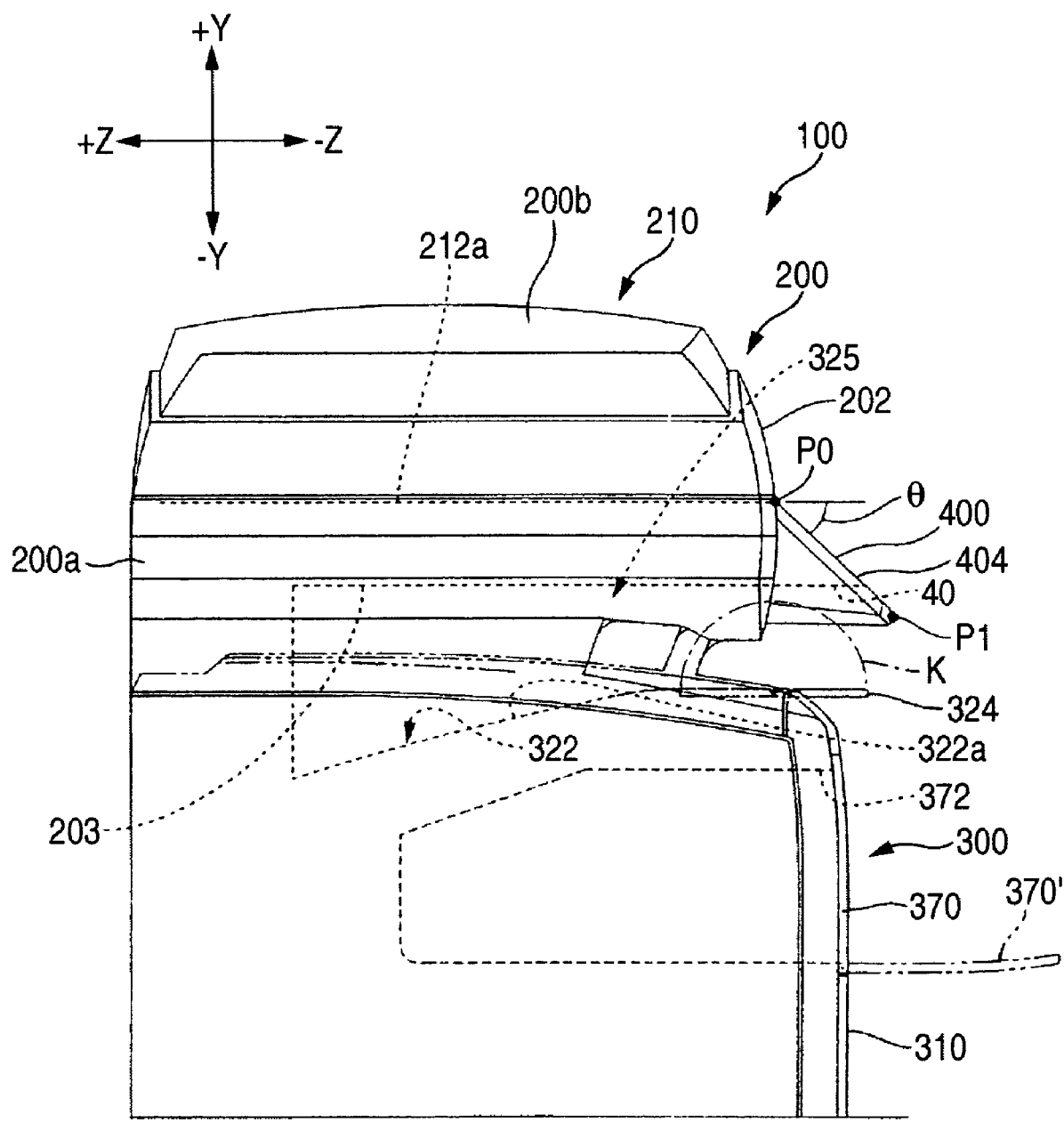
FIG. 2 is a side view showing the multifunctional apparatus of FIG. 1.
Figure 3:
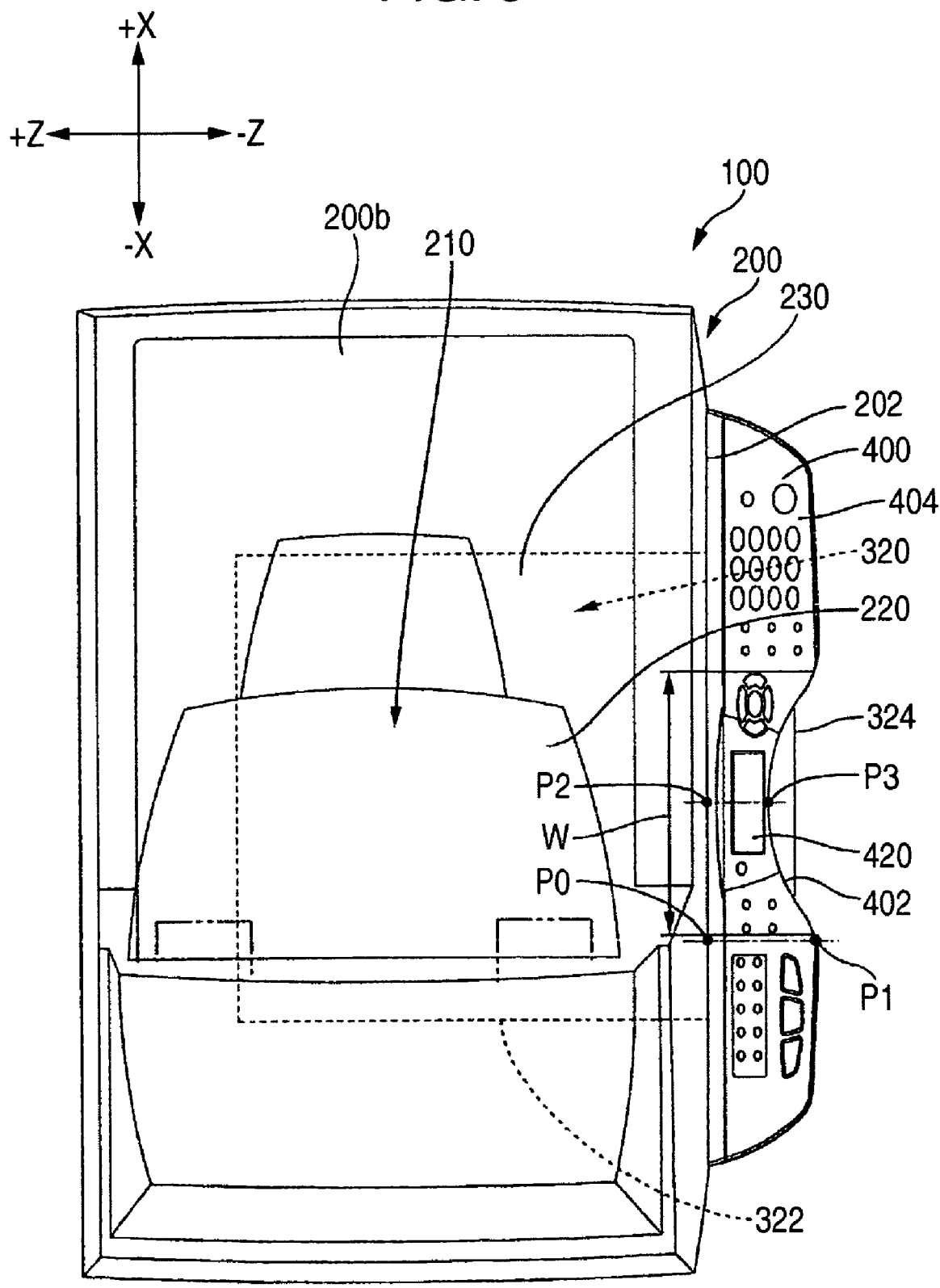
FIG. 3 is an upper view showing the multifunctional apparatus of FIG. 1

As shown in FIGS. 1 to 3 the multifunctional apparatus 100 comprises an image reading unit 200 for reading an original, an image forming unit for forming an image on a recording medium on the basis of the image data of the original thus read out, and an operating panel 400 for operating the multifunctional apparatus 100. A sheet discharge unit 320 having a sheet discharge port 323 and a sheet mount portion 322 on which a sheet discharged from the sheet discharge port 323 can be mounted is provided above the image forming unit 300, and the image reading unit 200 is provided above the sheet discharge unit 320 so as to cover substantially the overall upper portion of the sheet mount portion 322. the image reading unit 200 corresponds to the reading unit described in "Scope of Claim for Patent".

The multifunctional apparatus 100 is designed so that the image reading unit 200 having a substantially rectangular parallelepiped shape whose longitudinal direction corresponds to the right-and-left direction (X-axis direction) of the multifunctional apparatus and wider than the image forming unit 300 is mounted above the substantially cubic image forming unit 300, and the operating panel 400 is projected from the image reading unit 200 to the front side (−Z direction side) of the multifunctional apparatus 100.

ADF 210 is provided at the left end portion of the image reading unit 200 so as to extend in the depth direction (Z-direction) of the image reading unit 200. ADF 210 feeds an original mounted on an original tray 220 while a CCD image sensor 211 (see FIG. 4) installed therein is made to read the original, and then discharges the original thus read to a discharge tray 230. The original tray 220 is projected in a planar shape so as to form a slant surface extending from ADF 210 obliquely to an upper right side, and original scan be stacked and held on the original tray 220. The original tray 220 is provided with an original detecting sensor 221 (see FIG. 4) using a photosensor or the like for detecting whether an original is mounted on the tray or not. The discharge tray 230 is provided below the original tray 220 so as to extend over the right-and-left direction (X-axis direction) of the image reading unit 200 horizontally from ADF 210 to the right side so that originals which have been read out and discharged from ADF 210 can be stacked and held.

A lid portion 200b comprising the original tray 220, ADF 210 and the discharge tray 230 is designed so as to be swingable in an open/close style from the front side of the multifunctional apparatus 100 in the vertical direction while a support shaft (not shown) which is provided to the back side of the multifunctional apparatus 100 and whose axial direction corresponds to the X-axis direction is set as a fulcrum. A so-called flat bed type glass plate 212 (see FIG. 4) comprising a transparent glass plate on which an original is mounted to read the original is provided below the discharge tray 230 which is exposed when the lid portion 200b is opened.

Figure 4:
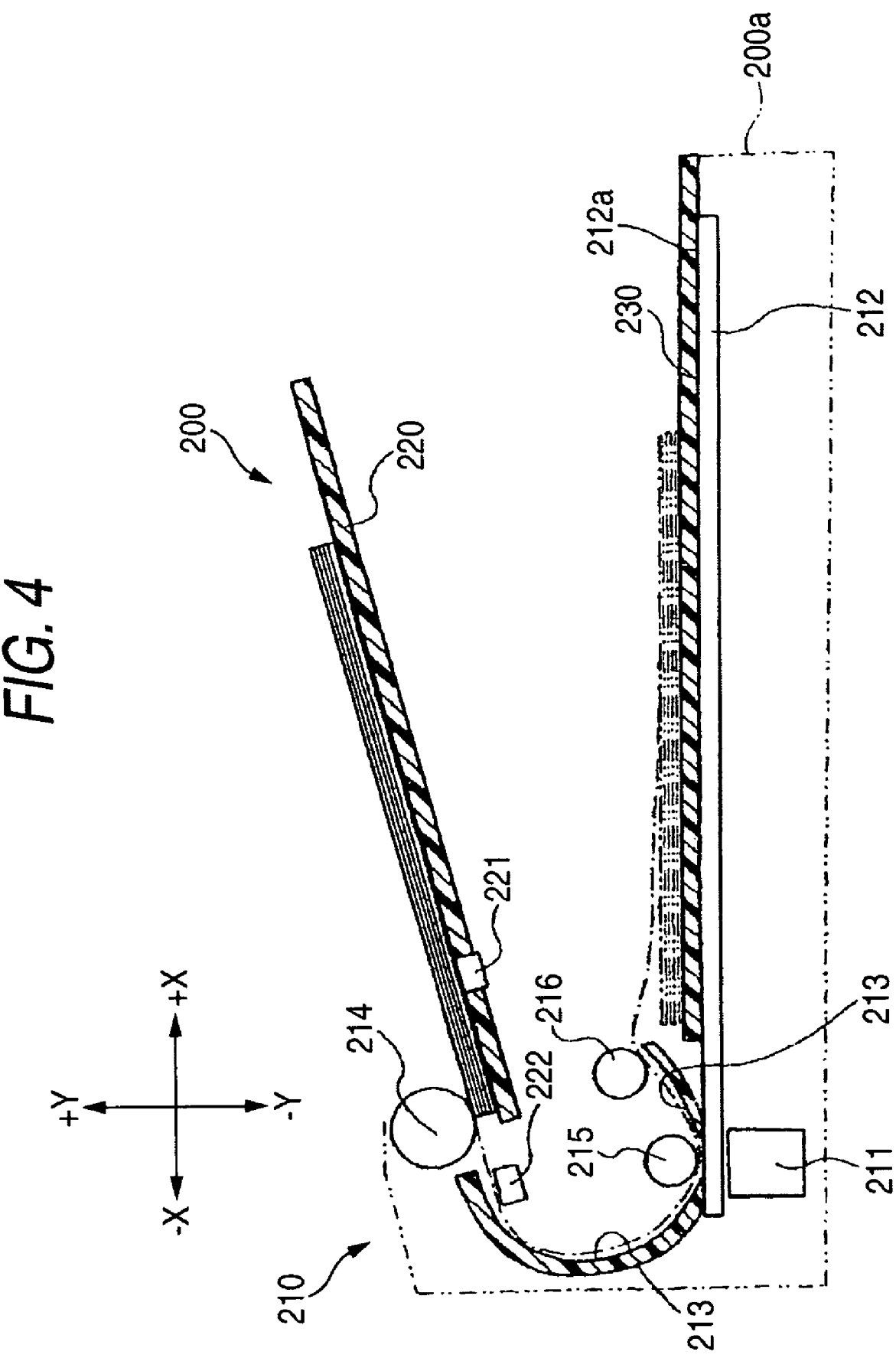
FIG. 4 is a diagram conceptually showing the internal construction of an image reading unit.

Here, in the image reading unit 200, the original mounted on the original tray 220 faces the CCD image sensor 211 through the glass plate 212, and a feed path 213 for guiding the original to the discharge tray 230 is provided so as to draw an arc as shown in FIG. 4. A supply roller 214 for separating originals mounted on the original tray 220 one by one and guiding the original thus separated to the feed path 213 is provided to the top portion at the upstream side in the original feeding direction of the feed path 213. The confronting portion to the CCD image sensor 211 on the feed path 213 is provided with a press roller 215 for pressing an original passing there and bringing the original into close contact with the glass plate 212, and a discharge roller 216 for discharging the original to the discharge tray 230 is provided at the terminal portion at the downstream side in the original feeding direction of the feed path 213. Furthermore, a passage detecting sensor 222 for detecting whether the original passes or not is provided in the neighborhood of the supply roller 214 on the route of the feed path 213.

Since the original feeding speed of ADF 120 is known by an experiment or the like in advance, the length of the original in the feeding direction can be estimated on the basis of a period till a timing at which the original thus fed is detected by the passage detecting sensor 222 (the detection timing of the leading end of the original in the feeding direction). Furthermore, if the detection of the original is not completed even when a predetermined time elapses, clogging of the original at the feeding time, that is, occurrence of so-called jam can be detected.

The CCD image sensor 211 is a line type sensor extending in a direction (Z-direction shown in FIG. 1) perpendicular to the feeding direction of the original (X-axis direction). Plural photodiodes (not shown) are arranged on a line in the extending direction (Z-axis direction) of the line sensor. In the CCD image sensor 211, reflection light when strong light is irradiated from a light source to an original is received by each photodiode, and light intensity (brightness) of the reflection light is converted to an electrical signal every pixel of the original. In the image reading unit 200, the electrical signal is converted to digital data by an A/D converter 550 (see FIG. 6), whereby an image formed on the original can be read out as image data.

The reading operation of the original may be carried out while the original is put on the plate surface 212a of the glass plate 212 or ADF 210 is used. In the former case, the CCD image sensor 211 is moved in the right-and-left direction (X-axis direction) along the plate surface 212a of the glass plate 212, and at this time the reading of the original mounted on the glass plate 212 is carried out line by line. In the latter case, the CCD image sensor 211 is moved to the left end portion of the glass plate 212 so as to confront the press roller 215 through the glass plate 212 and fixed at that position, and the reading of the original fed by ADF 210 is carried out line by line. The plate surface 212a of the glass plate 212 corresponds to the sheet mount face described in "Scope of Claim for Patent".

Next, the image forming unit 300 will be described. As shown in FIGS. 1 to 3, a sheet supply tray 310 for holding sheets as recording media while the sheets are stacked is provided below the image forming unit 300 so as to be mounted detachably from the front side of the multifunctional apparatus 100, and a sheet discharge unit 320 for holding sheets after images are formed thereon is provided at the upper side of the sheet supply tray 310. The sheet supply tray 310 is operated from the front side of the image forming apparatus so as to be opened.

Figure 5:
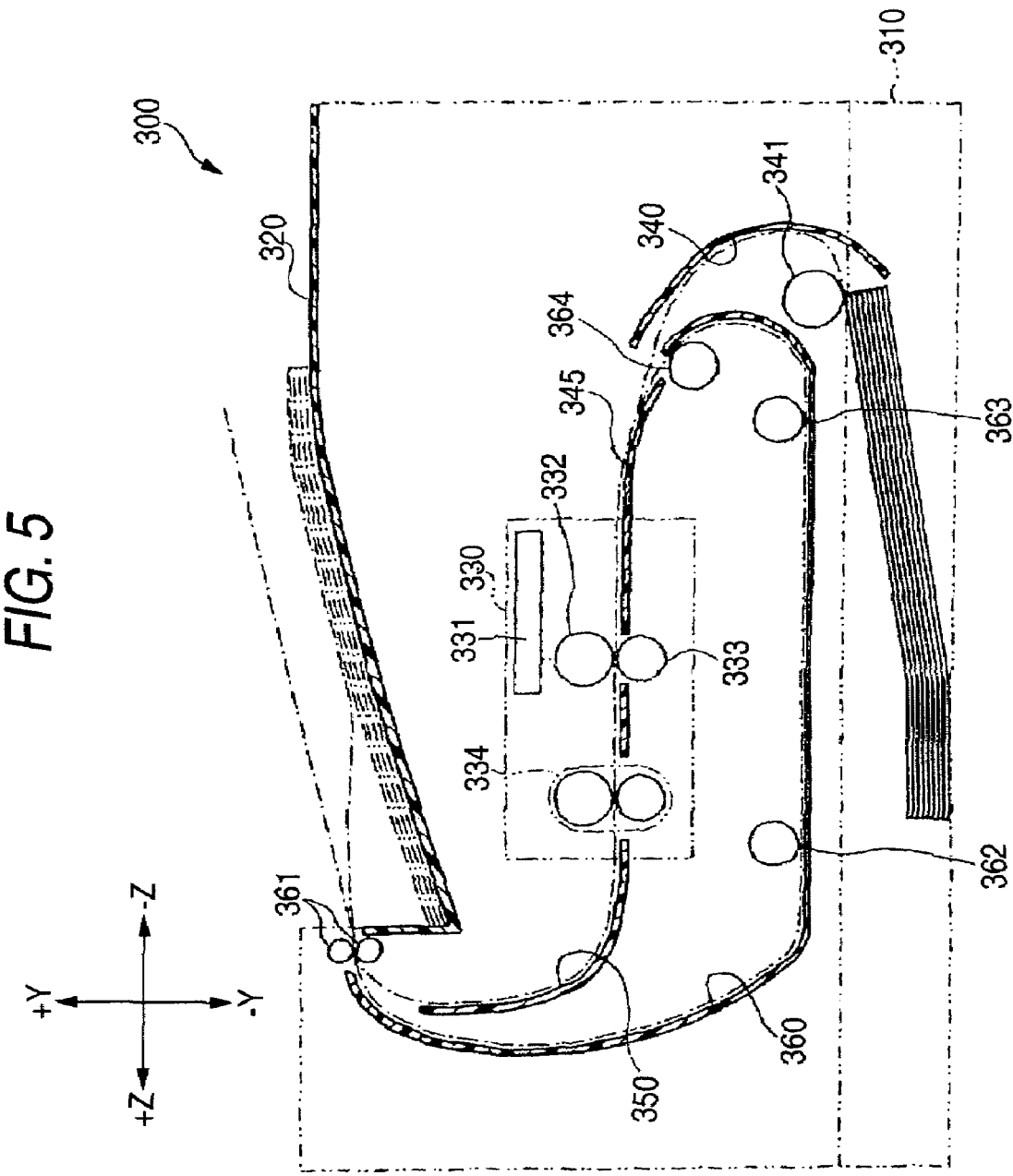
FIG. 5 is a diagram conceptually showing the internal construction of an image forming unit.

As shown in FIG. 5, a print unit 330 for forming a toner image on a sheet fed to the front side (−Z direction side) of the multifunctional apparatus by a well-known laser recording system is provided substantially at the center of the image forming unit 300. Furthermore, an S-shaped feeding path is provided so that a sheet is guided from the sheet supply tray 310 at the bottom portion through the print unit 330 to the sheet discharge unit 320 at the upper portion. The S-shaped feeding path comprises a semi-arcuate feeding path 340 for turning back to the back side a sheet fed to the front side of the multifunctional apparatus 100 by the sheet supply roller 341 provided at the upper side of the front side of the sheet supply tray 310, a feeding path 345 for guiding the sheet delivered from the feeding path 340 to the print unit 330, and a half-arcuate feeding path 350 for further turning back the sheet having an image formed thereon in the print unit 330 and guiding the sheet to the sheet discharge unit 320. A sheet discharge roller 361 for discharging the sheet to the sheet discharge unit 320 is provided at the terminal portion in the sheet feeding direction of the feeding path 350.

The print unit 330 is provided with a laser beam generator 331, a drum-shaped photosensitive member 332, a transfer roller 333, a fixer 334, etc. The laser beam generator 331 generates a laser beam on the basis of image data, and scans the surface of the photosensitive member 332 by the laser beam. The photosensitive member 332 is rotated while the surface thereof is uniformly electrified by an electrifier (not shown). The potential at an irradiation portion (bright portion) of the laser beam scanned by the laser beam generator 331 is reduced, and thus an electrostatic latent image is formed on the surface due to the potential difference occurring between the irradiation portion (bright portion) and a non-irradiation portion (dark portion). The transfer roller 333 is disposed so as to confront the photosensitive member 332 through a sheet, and it electrically attracts a toner image on the photosensitive member 332 which is formed when toner supplied from a developer (not shown) is selectively electrostatically adsorbed to the bright portion, and transfers the toner image onto the upper surface of a sheet passing between the transfer roller 333 and the photosensitive member 332. The fixer 334 fixes the toner onto the sheet by heating/pressurizing the sheet to which the toner image has been transferred. The image forming unit 300 corresponds to a print mechanism of the present invention. The image forming unit is also provided with a double-side printing mechanism comprising a feeding path 360, feeding rollers 362 to 364, etc.

In this embodiment, an opening portion 372 for exchanging parts constituting the image forming unit 300 is provided at the front surface portion of the housing surrounding the image forming unit 300, and a front cover 370 for covering the opening portion 372 so as to open/close the opening portion 372 is also provided. The front cover 370 is designed so that the upper portion thereof is set as a free end and it is rotatable around a rotational shaft in the width direction (X-axis direction) which is provided at the lower side, so that it is set to an open state indicated by a broken line 370' (see FIG. 2). An accommodating portion in which parts (for example, process cartridge, etc.) used for the image forming unit 300 are disposed is constructed inside the opening portion 372 (this accommodating portion is conceptually indicated by a broken line of FIG. 2).

As shown in FIGS. 1 to 3, the operating panel 400 is a panel type input/output unit extending in the right-and-left direction (X-axis direction), and it is provided with plural switches, buttons, etc. which are used by an user to operate the multifunctional apparatus 100. The specific construction and function of the operating panel will be described later.

Figure 6:
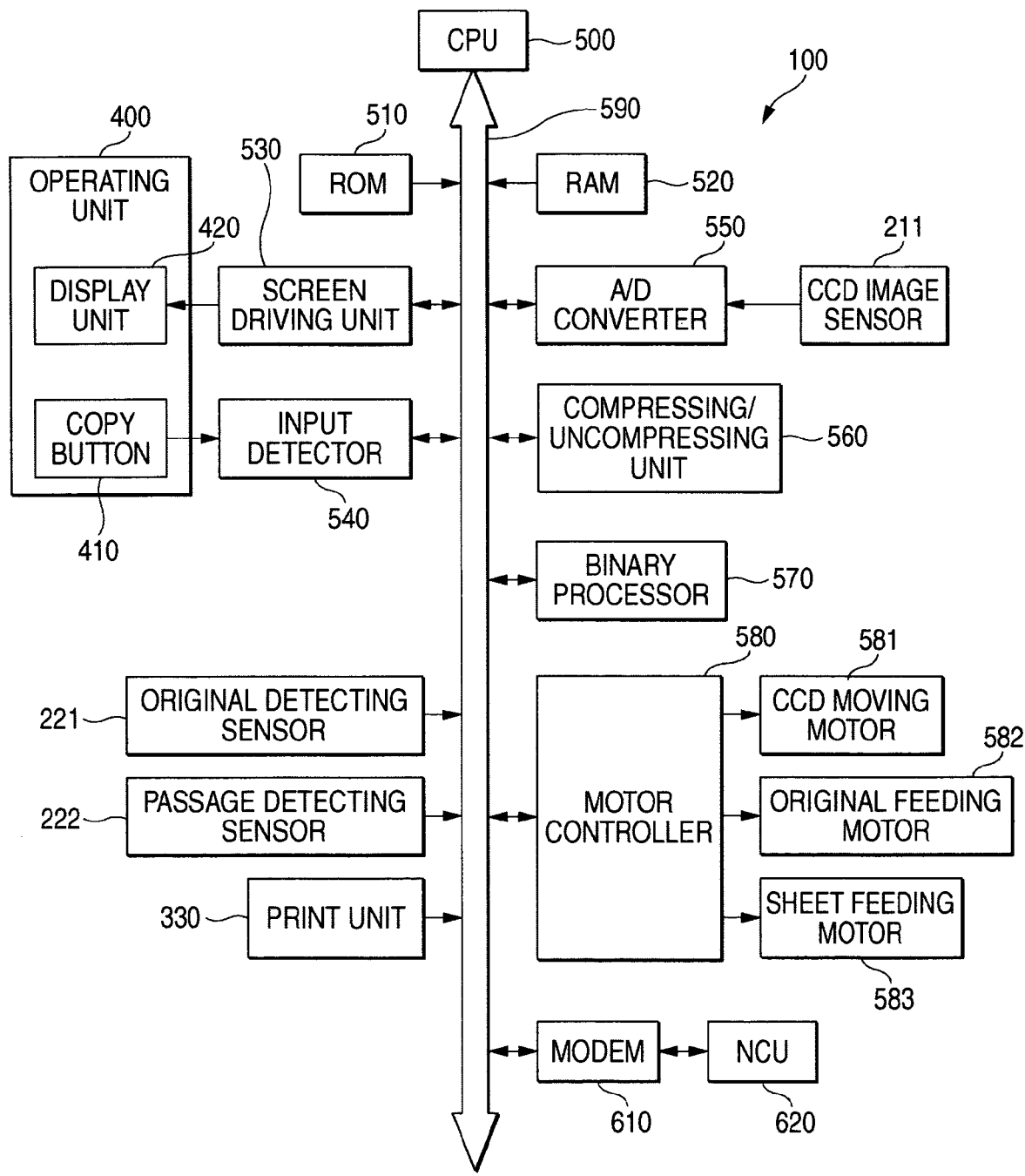
FIG. 6 is a block diagram showing an example of the electrical construction of the multifunctional apparatus.
Figure 7:
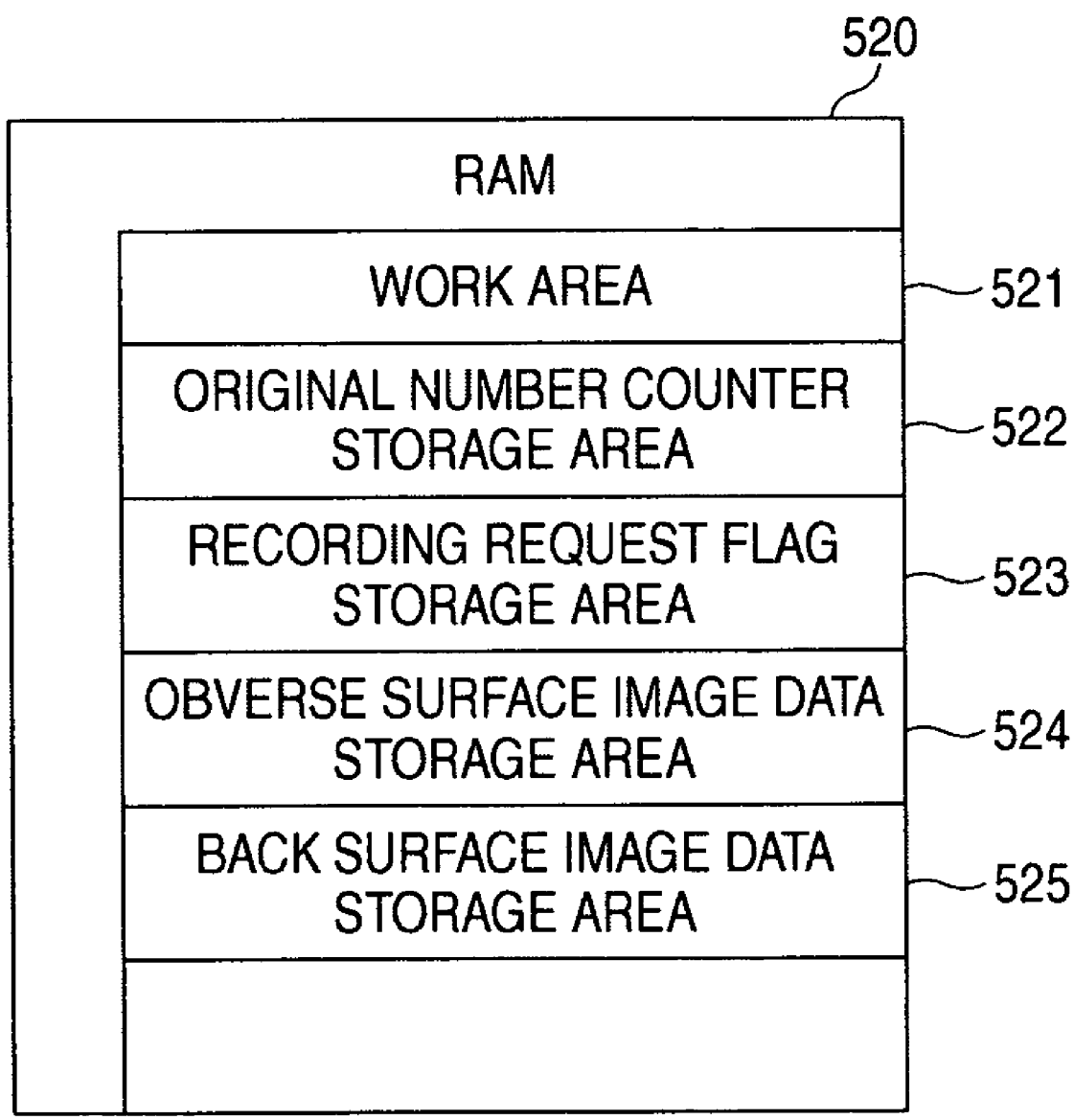
FIG. 7 is a diagram conceptually showing a memory construction.
Figure 8:
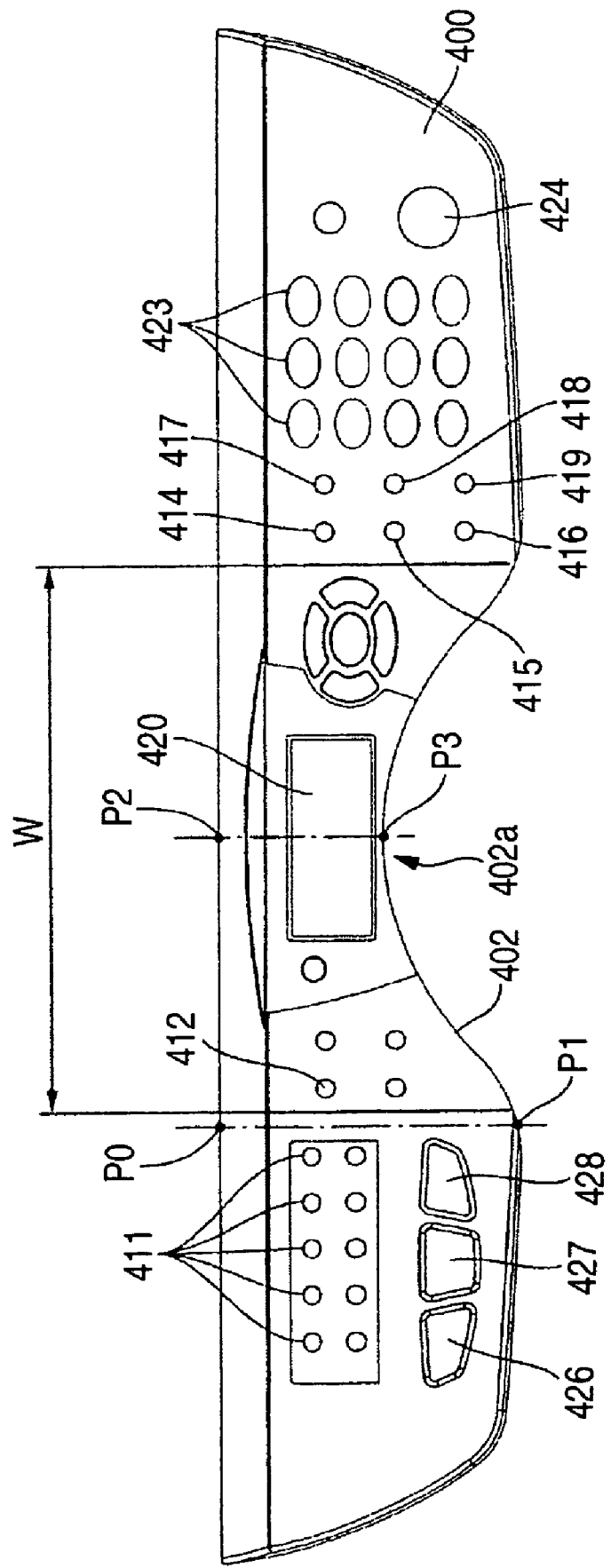
FIG. 8 is an enlarged view showing an operating panel.

Next, the electrical construction of the multifunctional apparatus 100 will be described with reference to FIGS. 6 and 7. As shown in FIG. 6, the multifunctional apparatus 100 comprises CPU 500, ROM 510, RAM 520, a screen driving unit 530, an input detector 540, an original detecting sensor 221, a passage detecting sensor 222, a print unit 330, an A/D converter 550, a compressing/uncompressing unit 560, a binary processor 570 and a motor controller 580 which are connected to a bus 590.

CPU 500 controls the multifunctional apparatus 100, and various kinds of programs executed by CPU 500, various kinds of settings, initial values, etc. are stored in ROM 510. ROM 520 stores temporary data in the data processing of CPU 500. The screen driving unit 530 controls to display characters and images on a display unit 420 connected to the screen driving unit 530. The display unit 420 corresponds to the image display unit described in "Scope of Claim for Patent". The input detector 540 detects an input of a copy button 410 provided to the operating panel 400. As not shown, the input detector 540 is connected to other plural switches, buttons, etc. provided to the operating panel 400.

The A/D converter 550 converts an image formed on an original and read out by the CCD image sensor 211 to digital data as image data. The binary processor 570 converts gradation information of the image data (information achieved by digitalizing the brightness of each pixel of the original) to binary values (the processing of converting the gradation information of each pixel of the image data to 1-bit data by using a threshold value). The compressing/uncompressing unit 560 carries out compression (encoding) to reduce the data amount of the binary image data and also uncompression (decoding) to return the compressed image data to the original non-compressed image data.

The motor controller 580 controls a CCD moving motor 581 for moving the CCD image sensor 211 when an original mounted on the glass plate 212 (see FIG. 4) is read out, a sheet feeding motor for driving the supply roller 214 of ADF 210, a press roller 215, a discharge roller 216, a sheet feeding roller (not shown), etc. Furthermore, the motor controller 580 is connected to other driving motors for driving other driving parts in the copy machine, such as the photosensitive member 332, the fixer 334, etc. in the print unit 330, for example.

Next, a storage area of RAM 520 will be described. As shown in FIG. 7, RAM 520 is provided with a work area 521 used for the data processing, etc. of the multifunctional apparatus 100, an original sheet number counter storage area 522 for storing counters "n", "m" for counting the number of originals to be read out, a storage request flag storage area 523 for storing a storage request flag for checking whether a print command has been already transmitted to the image forming unit 300, a front surface image data storage area 524 for storing image data of the front surface of each original, a back surface image data storage area 525 for storing image data of the back surface of each original, etc. As not shown, a storage area used for print programs for print, other data processing, etc. is also provided.

Next, the operating panel will be described.

As shown in FIGS. 1 to 3, the image reading unit 200 includes a base portion 200a having the glass plate 212 on an upper surface thereof, and the lid portion 200b that is disposed on the base portion 200a to cover the glass plate 212 from above. The lid portion 200b is openable/closable with respect to the base portion 200a, so that the glass plate 212 can be exposed when the lid portion 200b is opened. The operating panel 400 is provided at the front side of the base portion 200b so as to extend to the front side of the apparatus. Accordingly, the operating panel 400 is positioned distant from the area at which the glass plate 212 is disposed. The operating panel 400 includes an operating face 404 formed continuously with the plate surface 212a but having no step portion therebetween. The tip of the operating panel 400 is projected from the front end portion of the sheet mount unit 322 or the surface of the front cover 370 when it is closed. Furthermore, an opening portion 326 opened so that a sheet can be taken out from the front side of the apparatus is provided between the lower surface of the image reading unit 200 and the sheet mount face of the sheet mount unit 322. A part of the operating panel 400 in the width direction which faces the opening portion 326 is provided with an area in which the projection amount thereof from the image reading unit 200 is set to be smaller than the maximum projection amount of the operating panel 400 from the image reading unit 200. Specifically, when the direction along the operation face 404 of the operating panel 400 is set as the projection direction on the YZ plane of FIG. 2, the distance from the base portion to the tip portion of the operating panel 400 in the projection direction is defined as a projection amount. In this case, the operating panel 400 is provided with the area where the projection amount thereof is set to be smaller than the maximum projection amount (here, the distance between P0 and P1). More specifically, the operating panel 400 is provided so that the operating face 404 thereof extends from the front end edge 202 of the image reading unit 200 in the obliquely downward direction. Here, in this embodiment, the interval between the sheet mount face of the sheet mount unit 322 and the lower surface of the image reading unit 200 is set to be smaller than the conventional apparatus, and thus the overall height of the apparatus is lowered. With such a construction, when the operating panel 400 is designed so as to extend in the obliquely downward direction, the apparatus has such a shape that the tip side of the operating panel 400 covers the upper side of the opening portion 322, so that the opening range of the opening portion 326 is narrowed and visibility of the surrounding of the sheet discharging unit 320 is lowered. In order to solve this problem, according to this embodiment, a part of the peripheral edge of the operating panel 400 which faces the opening portion 326 is cut out to form a recess portion 402. In the area where the recess portion 402 is provided, the projection amount is set to be smaller than the maximum projection amount like the gap between P2 and P3 in FIG. 1. As described above, by forming the recess portion 402 in the operating panel 400, the operating panel 400 extending in the obliquely downward direction can be prevented from closing the opening portion 326 in a broad range. Therefore, even when the height of the apparatus is lowered, the visibility to the surrounding of the sheet discharging unit 320 can be prevented from being lowered, and also the workability of taking out a discharged sheet from the opening portion 326 can be prevented from being lowered.

Furthermore, as shown in FIG. 1, the height of the area where the recess portion 402 is provided (for example, the height between P2 and P3) is set to be lower than the maximum height (the height between P0 and P1) in the up-and-down direction (Y-axis direction) of the operating panel 400, and the gap is also enlarged in the up-and-down direction. Furthermore, as shown in FIG. 3, the length in the front-and-rear direction of the area where the recess 402 is provided is set to be smaller than the maximum length in the front-and-rear direction (the length in the front-and-rear direction between P0 and P1).

A stopper 324 is provided at the front end portion of the sheet mount unit 322. The stopper 324 is provided so as to be rotatable around an axial line parallel to the width direction, and the stopper is positionally set to a first position at which a part thereof extends ahead of the sheet mount unit 322 to support a sheet at the front side of the sheet mount unit (see FIG. 2) and a second position at which the stopper is accommodated at the sheet mount unit 322 side. In this construction, the length W in the width direction of the recess portion 402 (see FIGS. 3 and 8) is set to be equal to or longer than the length in the width direction of the stopper 324, and furthermore the arrangement between the recess portion 402 and the stopper 324 is set so that the rotational locus of the stopper 324 does not interfere with the operating panel. In FIG. 2, the locus of the tip portion of the stopper 324 is indicated by a one-dotted chain line, and the tip portions draws a locus which does not interfere with the operating panel 400. Specifically, when the stopper 324 is rotated between the first position indicated by a solid line and the second position indicated by a broken line in FIG. 2, the tip portion rotates forwards and rearwards while passing through the recess portion 402. In FIG. 2, the rotatable stopper is provided, however, a stopper slidable in the front-and-rear direction may be provided. As described above, when the stopper 324 for preventing falling of sheets is provided at the front end portion of the sheet mount unit 322, it can sufficiently fulfill its function as the stopper 324, and also when the stopper 324 is accommodated at the sheet mount unit 322 side, it can be excellently prevented from coming into contact with the operating panel 400. Particularly when the opening portion 326 is designed to be narrow, the distance between the stopper 324 and the operating panel 400 is reduced, and thus when no recess portion 402 is provided to the operating panel 400, it is necessary to restrict the size of the stopper 324 in order to prevent the interference between the operating panel 400 and the stopper 324. However, by providing the recess portion 402, the stopper 324 can be excellently formed without no restriction.

Furthermore, as shown in FIG. 2, the sheet mount face 322a of the sheet mount unit 322 and the lower surface portion 203 of the image reading unit 200 are arranged so as to be spaced from each other at a predetermined interval in the vertical direction, thereby constructing the sheet accommodating unit 325 in which recorded sheets discharged from the sheet discharge port 323 are stacked and accommodated. The upper end of the sheet accommodating unit 325 (that is, the lower surface portion of the image reading unit) and the upper end 402a of the recess portion 402 (see FIG. 1) are set to be substantially equal to each other in position (height) in the vertical direction. Furthermore, the upper end 402a of the recess portion 402 is set to be located at a higher position than the uppermost face of sheets on the sheet mount unit 322 when the maximum capacity loading sheets specified according to the specification are put on the sheet mount unit 32 in the multifunctional apparatus 100. In this construction, the visibility is enhanced over the whole sheet accommodating unit 325, and in connection with this, the work of taking out a sheet from the sheet accommodating unit 325 can be excellently performed. Furthermore, even when a relatively large amount of sheets are discharged, the sheets can be excellently taken out through the recess portion 402 because the upper end of the recess portion 402 of the operating panel 400 is located at a higher position than the uppermost face of the stacked sheets.

Furthermore, as described above, the image reading unit 200 comprises the lid portion 200b which can be opened/closed, the plate face 212a (original mount face) which is exposed when the lid portion 200b is opened and on which an original is mounted and the image sensor 211 as the reading mechanism which is provided at the lower side of the plate face 212a. The operating face 404 of the operating panel 400 is inclined so that the intersection angle between the plate face 212a and the operating face 404 of the operating panel 400 ranges from 30° to 60° (specifically, ranges from about 40° to about 50°). In this embodiment, θ is set to about 45°. Furthermore, the display unit 420 having the flat outer surface is provided to the operating panel 400, and the intersecting angle between the outer surface of the display unit 420 and the plate face 212a of the image reading unit 200 ranges from 30° to 60° (specifically, for example, ranges from 40° to 50°). In this embodiment, the operating face 404 and the outer surface of the display unit 420 are designed to be substantially parallel to each other, and the intersecting angle between the outer surface of the display unit 420 and the plate face 212a is set to substantially 45°. The operating panel 400 may be provided a display having an operating function (for example, a touch panel or the like). In this case, the intersecting angle between the outer surface of the display unit having the operating function and the plate face 212a on which the original is mounted can be set in the range from 30° to 60° (specifically, for example, in the range from 40° to 50°). With this construction, even when the apparatus is located at a high position or low position, the visibility and operability of the operating panel can be excellently secured. Furthermore, the problem that the operating panel 400 closes the opening portion 326 when the operating panel 400 is inclined can be solved by suitably forming the recess portion 402 in the operating panel 400 as described above.

Furthermore, as described above, the multifunctional apparatus 100 has plural kinds of functions such as a copying function, a FAX function, a printer function, etc. However, the operating panel 400 may be designed so that keys exclusively-used for only a first function of the plural kinds of functions are collectively arranged at any one of the right and left sides of the recess portion 402, and keys exclusively-used for the second function different from the first function are collectively arranged at the other side. In this embodiment, as enlarged in FIG. 8, keys exclusively-used for the copying function are arranged at one side (right side) of the recess portion 402. The keys exclusively-used for the copying function contain a magnification setting key 414 for setting a copy magnification, a copy image quality setting key 415 for setting copy image quality, a sort setting key 416 for setting an arrangement of pages after copy, a tray setting key 417 for setting a sheet tray being used, a contrast setting key 418 for setting contrast, and an Nin1 key 419 for enabling plural originals to be copied on one sheet. These keys are collectively arranged at the right side. If there are other keys exclusively-used for the copying function, these keys may be arranged at the right side together with the above keys. Abbreviated dialing keys 411 and a redialing key 412 exclusively-used for the FAX function are arranged at the other side (left side). Likewise, if there are other keys exclusively-used for the FAX function, these keys may be arranged at the left side together with the above keys. As described above, the keys for the common function are arranged at the same side of the recess portion 402, and thus the keys to be operated gather together nearly, so that the key operation can be easily performed to execute the respective functions.

In addition to the exclusively-used keys described above, keys used commonly to plural functions (numeric pads 423, start key 424, etc.) are arranged. The keys used commonly to the plural functions may be collectively arranged at only one side of the recess portion 402 or dispersively arranged at both the sides of the recess portion 402. Furthermore, they may be arranged in the neighborhood of the recess portion 402. In this embodiment, the operating panel 400 is provided with switching keys for switching plural kinds of functions (FAX switching key 426, copy switching key 427, a scan switching key 428) are provided so as to be located from the base portion of the recess portion 402 to the tip portion of the recess portion 402 in the projecting direction. By pushing any one of the switching keys 426 to 428, the function is switched to the function corresponding to the pushed key. With respect to the start key 424, it is disposed so as to be located from the base end portion 402a of the recess portion to the tip portion of the recess portion in the projecting direction of the operating panel 400. As described above, the relatively frequently used keys such as the switching keys, the start key, etc. are arranged at the tip side of the operating panel 400, and thus when this apparatus is disposed at a high position, the frequently used keys are arranged at the near side to the operator, and thus the operability can be enhanced.

Figure 9:
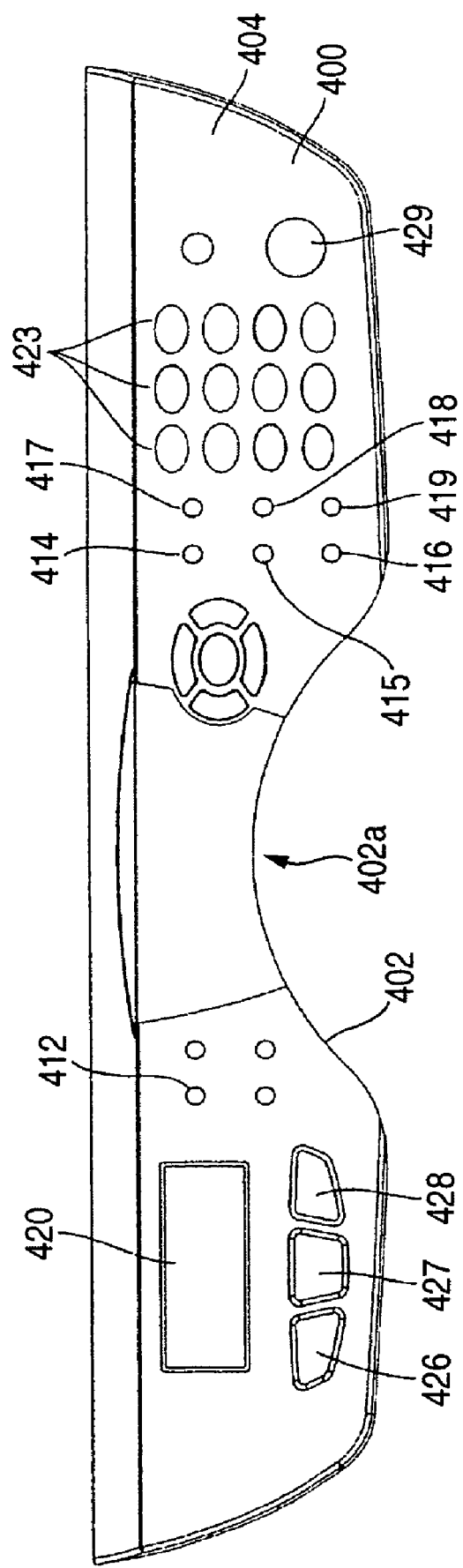
FIG. 9 is a diagram showing a modification of the operating panel.

Furthermore, the operating panel 400 may be constructed as shown in FIG. 9. In the operating panel 400 shown in FIG. 9, the display unit 420 (image display unit) for displaying an image on the operation is provided at only one side of right and left sides of the recess portion 402, and plural keys (numeric pads 423, the start key 424 or various kinds of keys 414 to 419 exclusively-used for the copying function) are arranged at the other side. As described above, the display unit 42 and the key operating portion are arranged so as to sandwich the recess portion 402 therebetween, whereby the key operation can be easily performed while viewing the display on the display unit 42.

Second Embodiment

Figure 10:
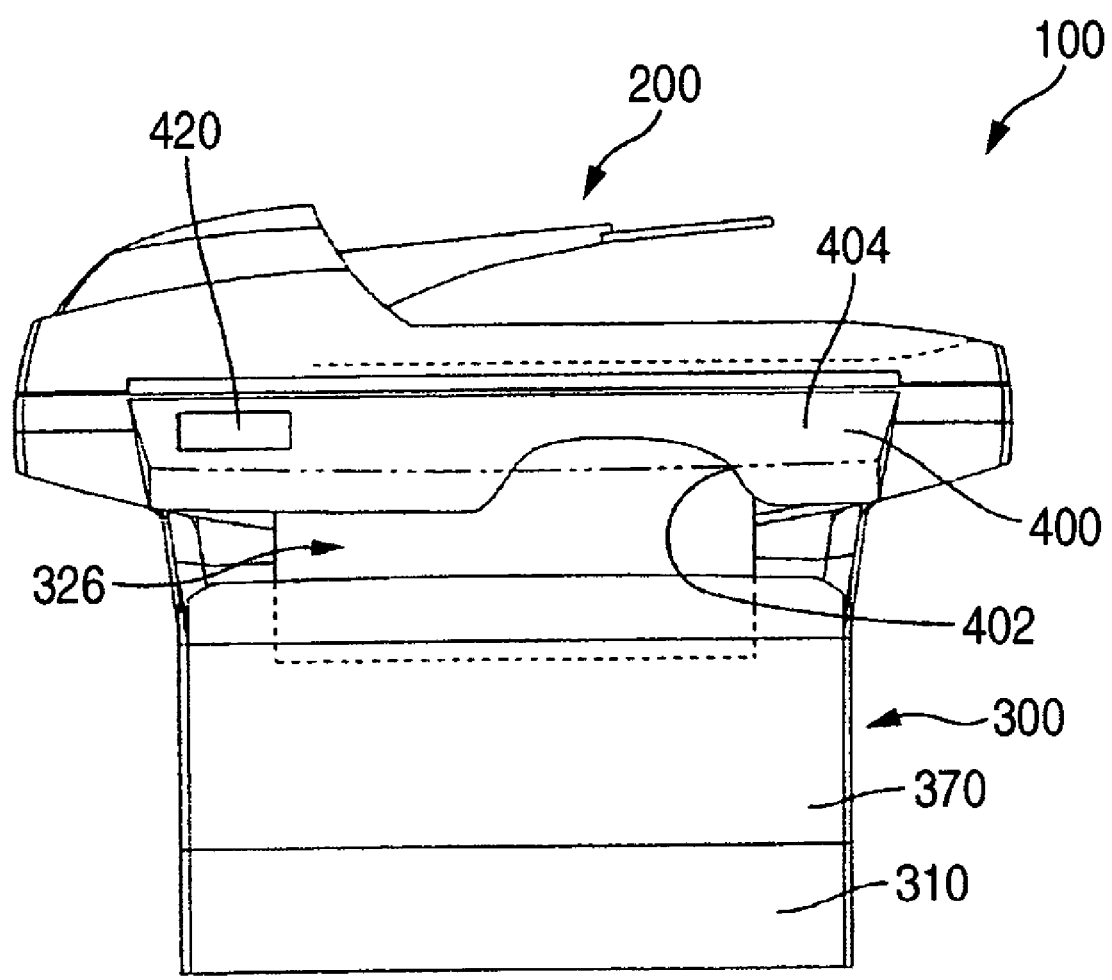
FIG. 10 is a front view showing a multifunctional apparatus according to a second embodiment of the present invention.

Next, a second embodiment of the present invention will be described with reference to FIG. 10.

The second embodiment is different from the first embodiment in the shape of the operating panel 400, and the other construction is the same. The elements having the same functions are represented by the same reference numerals, and the detailed description thereof is omitted. In the first embodiment shown in FIG. 1, etc., the recess portion 402 is disposed in the neighborhood of the center in the width direction of the operating panel 400. However, in FIG. 10, the recess portion 400 is disposed to be shifted to one side in the width direction of the operating panel 400. This construction is favorite to a case where a space at one of the right and left sides of the operating panel is required to be secured more surely. In FIG. 10, various kinds of keys are omitted from the illustration, however, the same key arrangement as shown in FIG. 1 may be adopted. As described above, it is unnecessary to provide the recess portion 402 in the neighborhood of the center, and the recess portion 402 may be formed at any place in the range confronting the opening portion 326. The number of recess portions may be set to two or more.

Third Embodiment

Figure 11:
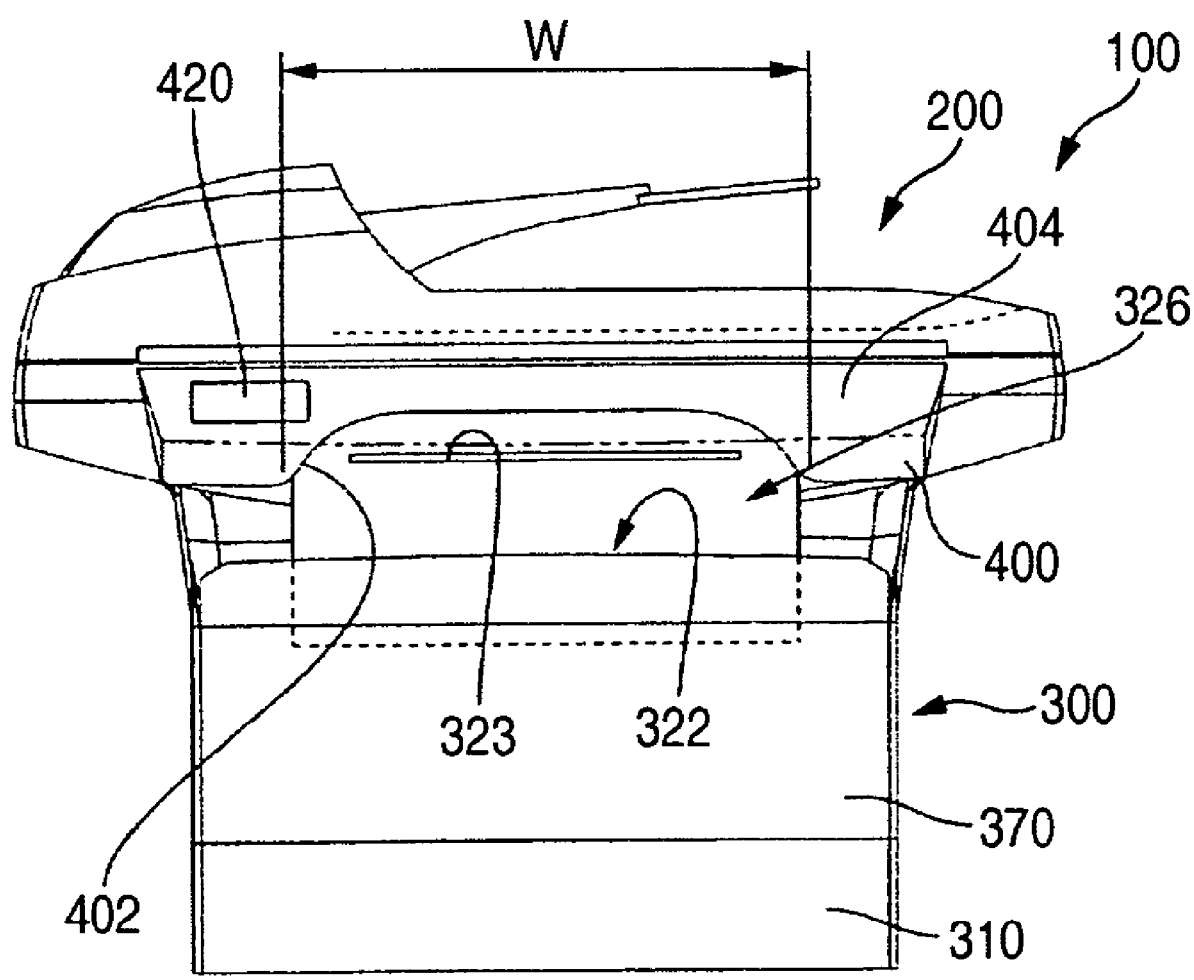
FIG. 11 is a front view showing a multifunctional apparatus according to a third embodiment of the present invention.

Next, a third embodiment of the present invention will be described with reference to FIG. 11.

The third embodiment is different from the first embodiment in the shape of the operating panel 400, and the other construction is the same. The elements having the same functions are represented by the same reference numerals, and the detailed description thereof is omitted. In FIG. 11, various kinds of keys are omitted from the illustration, however, the same key arrangement as shown in FIG. 1 may be adopted. In the multifunctional apparatus of this embodiment, the sheet discharge port 323 is formed so as to extend in the width direction at the rear side of the sheet mount unit 322 as in the case of the first embodiment, however, in this embodiment the length W in the width direction of the recess portion 402 is set to be equal to or more than the width of the sheet discharge port 323. In this embodiment, the sheet discharge port 323 is disposed at a higher position than the tip portion of the operating panel 400, and when viewed from the front side like FIG. 11, the sheet discharge port 323 can be wholly view through the recess portion 402. The sheet discharge port 323 may be disposed at the lower side of the tip portion of the operating panel 400.

Fourth Embodiment

Next, a fourth embodiment of the present invention will be described with reference to FIG. 12.

Figure 12:
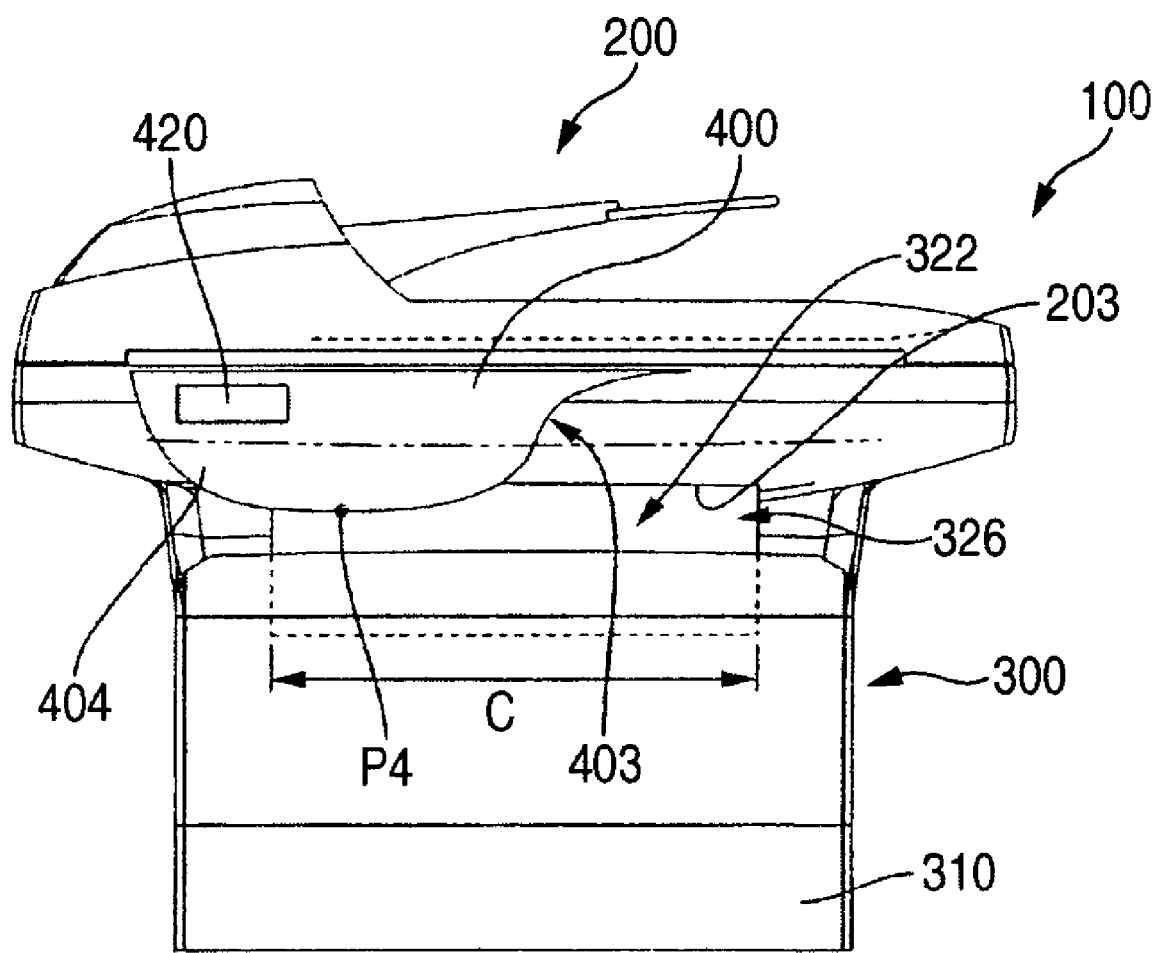
FIG. 12 is a front view showing a multifunctional apparatus according to a fourth embodiment of the present invention.

In FIG. 12, the cut-out portion 403 is provided to a part in the width direction of the operating panel 400 which faces the opening portion 326. In this embodiment, the operating panel 400 is not provided at a part of a width direction area C in which the opening portion 326 is provided. In the other area of the width direction area where the operating panel is provided, the tip portion of the operating panel 400 and the sheet mount unit 322 (opening portion 326) are proximate to each other so as to be spaced from each other at a predetermined distance. in the area of the width direction area C which corresponds to the cut-out portion 403, the sheet mount unit 322 and the operating panel 400 does not confront each other at the front end side, and the upper side of the opening portion 326 is kept open. Furthermore, the operating panel 400 has a predetermined curved shape, and the operating panel 400 is disposed so that the portion (around P4) of the operating panel 400 having the maximum projection amount from the image reading unit 200 is displaced from the center in the width direction of the opening portion 326. In the case of FIG. 12, the cut-out portion is provided to a part of the width direction area C so that the operating panel 400 is not provided. However, the operating panel 400 may be provided over the whole width direction area C, and a cut-out portion may be provided so that the projection amount at one side in the width direction is set to a small value. As described above, in place of the recess portion 402 having the small projection amount to the operating panel 400, the area where the operating panel 400 is not formed is provided to a part of the range confronting the opening portion 326, thereby achieving the same effect as the case where the recess portion 402 is formed.

The operating panel 400 may be designed in any shape. In this case, the operating panel 400 may be designed so that a portion at which a small projecting amount of the operating panel is small or a portion at which no operating panel is formed is provided in the neighborhood of the center in the width direction of the opening portion 326. Conversely, if the operating panel 400 is designed so that a portion at which the projection amount is large is located to be shifted from the center in the width direction of the opening portion 326, the visibility of the surrounding of the sheet discharging portion 320 and the workability of taking out a discharged sheet from the opening portion 326 can be excellently secure. Furthermore, the operating panel 400 may be designed so that a portion at which the projection amount of the operating panel is small or a portion at which the operating panel is not formed is located in the neighborhood of both the end portions in the width direction of the opening portion 326, or conversely the operating panel 400 may be designed so that a portion at which the projection amount is large is located in the neighborhood of the center in the width direction of the opening portion 326.

Other Embodiment

The present invention is not limited to the above embodiments described with reference to the drawings, and the following embodiment may be contained in the subject matter of the present invention. Furthermore, various modifications may be made without departing from the subject matter of the present invention.

(1) In the above embodiments, the operating panel 400 is disposed so as to be inclined to the plate face 212*a* (sheet mount face). However, in the construction that the recess portion 402 or the cut-out portion 403 as described above is provided, the operating panel may be disposed substantially horizontally or vertically to the plate face 212*a* (sheet mount face).

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

What is claimed is:

1. An image forming apparatus, comprising:
    a print mechanism;
    a sheet discharge unit located above the print mechanism, the sheet discharge unit having a sheet discharge port and a sheet mount unit that mounts thereon a sheet discharged from the sheet discharge port;
    a reading unit disposed above the sheet discharge unit so as to cover substantially an overall upper portion of the sheet mount unit; an operating panel; and
    an opening portion formed between a lower surface of the reading unit and a sheet mount face of the sheet mount unit;
    wherein, when the downstream side in a discharge direction of a sheet discharged from the sheet discharge port to the sheet mount unit is set as a front side of the apparatus, the opposite side is set as a rear side and a direction perpendicular to the front-and-rear direction is set as a width direction, the operating panel extends to the front side of the apparatus in the reading unit so that the tip thereof is located at the same position as the front end portion side of the sheet mount unit or projects from the front end portion side along the operating panel;
    the opening portion is opened so that the sheet can be taken out from the front side of the apparatus; and
    there is provided an area where a projection amount of the operating panel from the reading unit along the operating panel is set to be smaller than a maximum projection amount of the operating panel from the reading unit along the operating panel.

2. The forming apparatus according to claim 1, wherein the area includes a cut-out portion provided to a part in the width direction of the operating panel which faces the opening portion.

3. The image forming apparatus according to claim 1, wherein the operating panel extends from the front side end edge of the reading unit downwardly or obliquely downwardly.

4. The image forming apparatus according to claim 1, wherein a recess portion is formed at a part in the width direction of the peripheral edge of the operating panel which faces the opening portion.

5. The image forming apparatus according to claim 4, wherein the sheet discharge port is designed so as to extend in the width direction at the rear side of the sheet mount unit, and the length in the width direction of the recess portion is set to be equal to or longer than the width of the sheet discharge port.

6. The image forming apparatus according to claim 4, further comprising: a stopper which is rotatable around an axial line parallel to the width direction or slidable in the front-and-rear direction at the front end portion of the sheet mount unit;
    wherein the stopper is positionally set to a first position at which a part thereof is extended ahead of the sheet mount unit to support a sheet at the front side of the sheet mount unit and a second position at which the stopper is accommodated at the sheet mount unit side; and
    the length in the width direction of the recess portion is set to be equal to or longer than the length in the width direction of the stopper.

7. The image forming apparatus according to claim 6, wherein when the stopper is rotated between the first position and the second position, the tip portion thereof is rotated forward and backward while passing through the recess portion.

8. The image forming apparatus according to claim 4, further comprising: a stopper which is rotatable around an axial line parallel to the width direction at the front end portion of the sheet mount unit;
    wherein the stopper is positionally set to a first position at which a part thereof is extended ahead of the sheet mount unit to support a sheet at the front side of the sheet mount unit, and a second position at which the stopper is accommodated at the sheet mount unit side; and
    the arrangement relationship between the recess portion and the stopper is set so that a rotational locus of the stopper does not interfere with the operating panel.

9. The image forming apparatus according to claim 8, wherein, when the stopper is rotated between the first position and the second position, the tip portion thereof is rotated forward and backward while passing through the recess portion.

10. The image forming apparatus according to claim 4, further comprising: a sheet accommodating unit formed between the sheet mount face of the sheet mount unit and the lower surface portion of the reading unit, both disposed so as to be spaced from each other at a predetermined interval in the vertical direction;
    wherein the upper end of the sheet accommodating unit and the upper end of the recess portion are set to be located substantially at the same position in the vertical direction.

11. The image forming apparatus according to claim 10, wherein the first kind of function is a copy function; and
    the second kind of function is the FAX function.

12. The image forming apparatus according to claim 4, further comprising: a plurality of keys corresponding to plural kinds of functions;
    wherein the plurality of keys include keys exclusively-used for a first kind of function collectively arranged at any one of the right and left sides of the recess portion; and
    the plurality of keys include keys exclusively-used for a second kind of function different from the first kind are collectively arranged at the other side.

13. The image forming apparatus according to claim 4, wherein the operating panel includes an image display unit configured to display an image relating to an operation, and a plurality of keys;
    the image display unit is provided at one of the right and left sides of the recess portion; and
    the plurality of keys are disposed at the other side.

14. The image forming apparatus according to claim 4, wherein the operating panel is provided with switching keys for switching a plurality of kinds of functions; and
    the switching keys are located from the base portion of the recess portion to the tip side of the recess portion.

15. The image forming apparatus according to claim 1,
wherein the operating panel has a predetermined curved shape; and
the operating panel has a portion having the maximum projection amount from the reading unit, the portion displaced from the center in the width direction of the opening portion.

16. The image forming apparatus according to claim 1,
wherein the reading unit includes:
  a lid portion which is openable and closable,
  an original mount face on which an original is mounted, the original mount face exposed when the lid portion is opened, and
  a reading mechanism provided at a lower side of the original mount face; and
the original mount face and the operating face of the operating panel are inclined to each other.

17. The image forming apparatus according to claim 16,
wherein the operating panel includes an operating face;
the reading unit includes an original mount face on which an original is mounted; and
the operating face and the original mount face are inclined to each other so that the intersecting angle therebetween is set in the range from 30.degree. to 60.degree.

18. The image forming apparatus according to claim 1,
wherein the operating panel includes a display portion having a flat outer surface; and
the reading unit includes an original mount face on which an original is mounted;
the display portion and the original mount face of the reading unit are inclined to each other so that the intersecting angle therebetween is set in the range from 30.degree. to 60.degree.

19. The image forming apparatus according to claim 1, further comprising: a housing that surrounds the print mechanism;
wherein the housing has an openable/closable opening portion at the front portion thereof, the openable/closable opening portion allowing parts of the print mechanism to be replaced therethrough.

20. The image forming apparatus according to claim 1, further comprising: a sheet supply tray that supplies a sheet to the print mechanism;
wherein the sheet supply tray is manipulated from the front side of the image forming apparatus so as to be opened.

21. The image forming apparatus according to claim 4,
wherein, when sheets of the maximum capacity loading of the image forming apparatus are put on the sheet mount unit, the upper end of the recess portion is located at a higher position than the uppermost surface of the sheets.

22. The image forming apparatus according to claim 1,
wherein the reading unit includes a base portion and a lid portion that is openable and closable with respect to the base portion; and
the operating panel extends from the base portion.

23. An image forming apparatus, comprising:
a print mechanism;
a sheet discharge unit located above the print mechanism, the sheet discharge unit having a sheet discharge port and a sheet mount unit that mounts thereon a sheet discharged from the sheet discharge port;
a reading unit disposed above the sheet discharge unit so as to cover substantially an overall upper portion of the sheet mount unit;
an operating panel; and
an opening portion formed between a lower surface of the reading unit and a sheet mount face of the sheet mount unit;
wherein, when the downstream side in a discharge direction of a sheet discharged from the sheet discharge port to the sheet mount unit is set as a front side of the apparatus, the opposite side is set as a rear side and a direction perpendicular to the front-and-rear direction is set as a width direction, the operating panel extends to the front side of the apparatus in the reading unit so that the tip thereof is located at the same position as the front end portion side of the sheet mount unit or projects from the front end portion side; and
the reading unit has an original mount face on which an original is mounted;
there is provided an area where a projection amount of the operating panel from the reading unit along the operating panel is set to be smaller than a maximum projection amount of the operating panel from the reading unit along the operating panel; and
the operating panel has an operating face that is inclined to the original mount face.

24. The image forming apparatus according to claim 23,
wherein the operating face and the original mount face are inclined to each other so that the intersecting angle therebetween is set in the range from 30.degree. to 60.degree.

25. An image forming apparatus, comprising:
a print mechanism;
a sheet discharge unit located above the print mechanism, the sheet discharge unit having a sheet discharge port and a sheet mount unit that mounts thereon a sheet discharged from the sheet discharge port;
a reading unit disposed above the sheet discharge unit so as to cover substantially an overall upper portion of the sheet mount unit;
an operating panel; and
an opening portion formed between a lower surface of the reading unit and a sheet mount face of the sheet mount unit;
wherein the operating panel extends to the front side of the apparatus in the reading unit so that the tip thereof is located at the same position as the front end portion side of the sheet mount unit or projects from the front end portion side;
the opening portion is opened so that the sheet can be taken out from the front side of the apparatus; and
there is provided an area where a projection amount of the operating panel from the reading unit along the operating panel is set to be smaller than a maximum projection amount of the operating panel from the reading unit along the operating panel.

* * * * *